US009430702B2

(12) United States Patent
Ahn et al.

(10) Patent No.: US 9,430,702 B2
(45) Date of Patent: Aug. 30, 2016

(54) CHARACTER INPUT APPARATUS AND METHOD BASED ON HANDWRITING

(71) Applicant: Korea Electronics Technology Institute, Seongnam-si, Gyeonggi-do (KR)

(72) Inventors: Yang Keun Ahn, Seoul (KR); Chan Kyu Kim, Pyeongtaek-si (KR); Kwang Mo Jung, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 14/536,815

(22) Filed: Nov. 10, 2014

(65) Prior Publication Data

US 2016/0012285 A1  Jan. 14, 2016

(30) Foreign Application Priority Data

Jul. 10, 2014 (KR) ........................ 10-2014-0086762
Jul. 21, 2014 (KR) ........................ 10-2014-0092176

(51) Int. Cl.
| | | |
|---|---|---|
| G06K 9/18 | (2006.01) | |
| G06K 9/00 | (2006.01) | |
| G06K 9/62 | (2006.01) | |
| G06T 11/60 | (2006.01) | |
| G06F 3/01 | (2006.01) | |

(52) U.S. Cl.
CPC ........... *G06K 9/00422* (2013.01); *G06F 3/017* (2013.01); *G06K 9/6201* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 7,721,222 B1* | 5/2010 | Shaik | ...................... | G06F 3/018 345/156 |
| 7,802,184 B1* | 9/2010 | Battilana | ............... | G06F 3/0236 715/256 |
| 7,979,795 B2* | 7/2011 | Borgaonkar | ............ | G06F 3/018 345/169 |
| 8,726,148 B1* | 5/2014 | Battilana | ............... | G06F 17/273 715/234 |
| 9,009,026 B2* | 4/2015 | Tanaka | ................ | G06F 17/2223 704/9 |
| 9,292,739 B1* | 3/2016 | Gray | .................. | G06K 9/00456 |
| 9,300,322 B2* | 3/2016 | Shirguppi | ............. | H03M 7/705 |
| 2004/0041798 A1* | 3/2004 | Kim | ...................... | G06F 1/1626 345/179 |
| 2004/0184659 A1* | 9/2004 | Bang | ..................... | G06F 3/0346 382/186 |
| 2007/0124703 A1* | 5/2007 | Sohn | ....................... | G06F 3/017 715/863 |
| 2008/0025613 A1* | 1/2008 | Kumar | ................ | G06F 3/03545 382/189 |
| 2010/0130257 A1* | 5/2010 | Jang | ........................ | G06F 3/016 455/566 |
| 2011/0075929 A1* | 3/2011 | Jang | ................... | G06K 9/00872 382/186 |
| 2012/0069027 A1* | 3/2012 | Yamazaki | ............... | G06F 3/018 345/472.3 |
| 2012/0213442 A1* | 8/2012 | Oda | ...................... | G06K 9/6814 382/182 |
| 2013/0311880 A1* | 11/2013 | Shin | ...................... | G06F 17/214 715/268 |

* cited by examiner

*Primary Examiner* — Chan Park
*Assistant Examiner* — Mia M Thomas
(74) *Attorney, Agent, or Firm* — Sughrue Mion, PLLC

(57) ABSTRACT

An apparatus and a method for inputting a character using user's motion is provided. When a user's hand makes a motion, a character input pattern is recognized from the motion, a character to be input is determined by comparing the recognized character input pattern with character input pattern information which predefines various character input patterns and corresponding characters, and the determined character is displayed.

5 Claims, 8 Drawing Sheets

MOTION OF CROOKING THUMB
IN STATE IN WHICH THUMB AND
INDEX FINGER ARE SPREAD OUT

MOTION OF SPREADING OUT THUMB
IN STATE IN WHICH INDEX FINGER
IS SPREAD OUT AND THUMB IS CROOKED

CHARACTER INPUT APPARATUS AND METHOD BASED ON HANDWRITING

CROSS-REFERENCE TO RELATED APPLICATIONS

This application claims priority under 35 U.S.C. §119 to Korean Patent Application No. 10-2014-0086762, filed on Jul. 10, 2014, and Korean Patent Application No. 10-2014-0092176, filed on Jul. 21, 2014, the disclosure of which is incorporated herein by reference in its entirety.

TECHNICAL FIELD

The present invention relates to a character input apparatus and method based on handwriting, and more particularly, to a character input apparatus and method based on handwriting capable of recognizing a motion of a user's hand and inputting a character in a contactless manner according to the recognized motion of the hand.

BACKGROUND

Over the past few decades, the use of electronic devices has been common. In particular, the advancement of electronic technologies has cut down on costs for complicate, useful electronic devices. The reduction in cost and consumer demand have spurred the use of electronic devices toward being practically ubiquitous in the modern society.

As the purposes of electronic devices have extended, demand for new, improved features of electronic devices has also extended. Specifically, electronic devices executing functions quickly and effectively or high quality functions have been increasingly pursued.

A great number of electronic devices use one or more interfaces for operations. For example, computers use a keyboard and a mouse to obtain a user input for an interaction. Other electronic devices use a touch screen and/or a touch pad to obtain a user input for an interaction.

Among the interactions, many of them require a direct physical interaction with a hardware piece. For example, a user should do the typing on a keyboard in order to input text or a command through a keyboard.

Or, in order to interact with a computer via a mouse, a user should physically move and/or push one or more buttons of the mouse.

In some cases, a direct interaction with a hardware piece to provide inputs or commands to a computing device may be inconvenient or may not be optimal. For example, it may be inconvenient for the user, who provides a projected presentation, to return to a computer whenever an interaction is desired. In addition, carrying an interface device such as a mouse or a wand, while providing a presentation, may be inconvenient if the user does not accustom herself or himself to a method of providing an input by pressing a directional pad or operating the interface device.

Also, in a handwriting type input scheme in which a user directly takes notes by using an input device such as a touch pad, generally, the user may write down a character with a tool such as a pen or with his or her hand, and the written character or a form similar to the corresponding written character may be searched to be recognized. Here, the user should not perform inputting but wait for a predetermined period of time, causing a problem in that a time required for character recognition, which corresponds to the time for which the user should wait for the character recognition, is lengthened.

In addition, in the related art handwriting-type input scheme, characters are recognized by a predetermined unit, and thus, a user should input at least one letter for an inputting operation. However, as mobile communication terminals have become reduced in size, the area for inputting handwriting has also been reduced, and thus, in particular, children or senior citizens, who generally tend to write big letters, have difficulty in performing inputting due to the insufficient area or writing small letters to fit the input area.

There has been a great effort into improvement of such problems, but a satisfying result has not been insured yet. Thus, a method for conveniently and effectively inputting Hangul to increase an input speed is urgently required.

SUMMARY

Accordingly, the present invention provides a character input apparatus and method based on handwriting capable of recognizing a motion of a user's hand and inputting a character according to the recognized motion of the hand in a contactless manner.

In one general aspect, a character input apparatus based on handwriting includes: an image obtaining unit configured to obtain an image of a motion of a hand moving in a space; a pattern storage unit configured to store various types of character input pattern information required for inputting characters; a pattern recognizing unit configured to recognize a character input pattern from the image of a motion of a hand obtained by the image obtaining unit, compare the recognized character input pattern with the character input pattern information stored in the pattern storage unit, and output a character matched to the same pattern; and an input character display unit configured to display the character output from the pattern recognizing unit.

The image obtaining unit may be a depth camera.

The character input pattern information stored in the pattern storage unit may include: a character input start pattern information indicating starting of character inputting; a character input end pattern indicating ending of character inputting; and character pattern information matched to a character intended to be input.

When the recognized pattern corresponds to a consonant and repeated twice within a predetermined period of time, the pattern recognizing unit may determine that the pattern corresponds to a pair consonant, and output a corresponding character.

When the recognized pattern is a vowel and another vowel continuously follows, the pattern recognizing unit may determine that the pattern corresponds to a derivative vowel, combine the two successive vowels, and output a combined vowel.

After an operation for inputting a character is executed, if an image is not input within a predetermined period of time, the pattern recognizing unit may determine that character inputting has been terminated.

The input character display unit may include: a character display unit configured to display a character matched to a currently recognized pattern; and a letter display unit configured to display a letter based on combination of characters recognized so far.

When the recognized pattern is the input start pattern, the pattern recognizing unit may determine that character inputting starts, and when the recognized pattern is the input end pattern, the pattern recognizing unit may determine that character inputting ends.

In another general aspect, a character input method based on handwriting includes: storing various types of character input pattern information required for inputting characters; obtaining an image of a motion of a hand moving in a space; recognizing a character input pattern from the obtained image of a motion of a hand, comparing the recognized character input pattern with the stored character input pattern information, and outputting a character matched to the same pattern; and displaying the output character.

The image of a motion of a hand may be obtained by a depth camera.

The stored character input pattern information may include: a character input start pattern information indicating starting of character inputting; a character input end pattern indicating ending of character inputting; and character pattern information matched to a character intended to be input.

In the outputting of a character, when the recognized pattern corresponds to a consonant and repeated twice within a predetermined period of time, it may be determined that the pattern corresponds to a pair consonant and a corresponding character may be output.

In the outputting of a character, when the recognized pattern is a vowel and another vowel continuously follows, it may be determined that the pattern corresponds to a derivative vowel, and the two successive vowels may be combined to be output.

In the outputting of a character, after an operation for inputting a character is executed, if an image is not input within a predetermined period of time, it may be determined that character inputting has been terminated.

The displaying of a character may include: displaying a character matched to a currently recognized pattern; and displaying a letter based on combination of characters recognized so far.

When the recognized pattern is the input start pattern, it may be determined that character inputting starts, and when the recognized pattern is the input end pattern, it may be determined that character inputting ends.

Other features and aspects will be apparent from the following detailed description, the drawings, and the claims.

DETAILED DESCRIPTION OF EMBODIMENTS

Figure 1:
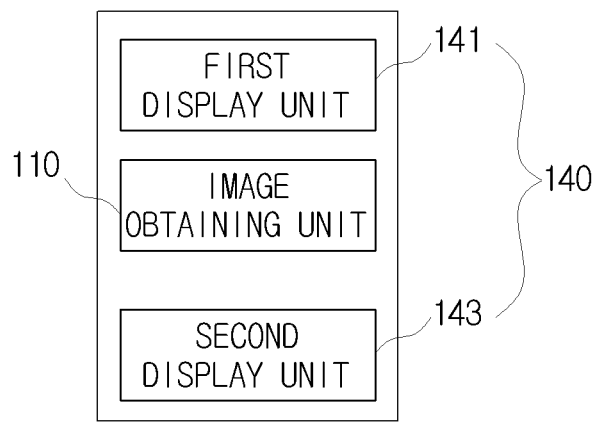
FIG. 1 is a character input apparatus based on handwriting according to an embodiment of the present invention

Hereinafter, embodiments of the present invention will be described in detail with reference to the accompanying drawings.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Throughout the specification, like reference numerals denote like components.

In describing the present invention, a detailed description of known techniques associated with the present invention unnecessarily obscure the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification.

Hereinafter, a configuration and function of a character input apparatus based on handwriting according to an embodiment of the present invention will be described with reference to the accompanying drawings. Character input based on handwriting according to an embodiment of the present invention is not limited to a particular language, but will be described on the assumption of Hangul input, for the purposes of description.

Figure 2:
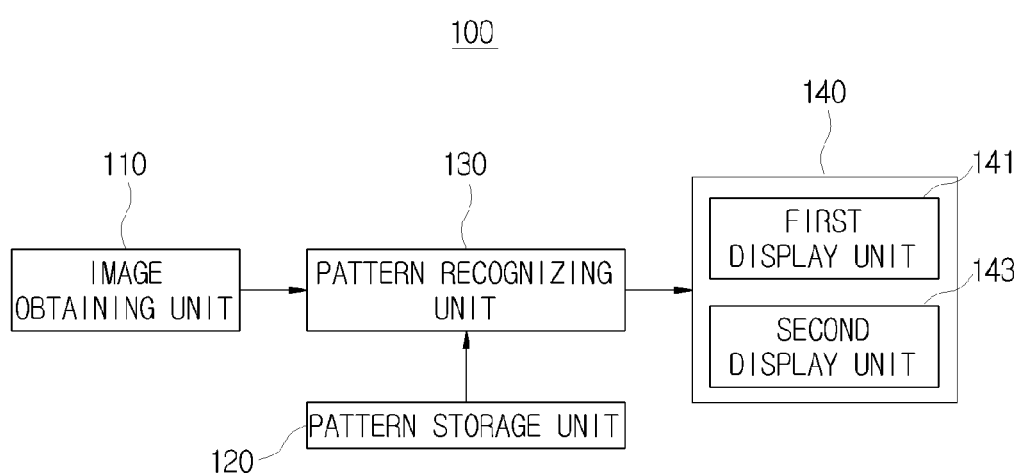
FIG. 2 is a block diagram functionally illustrating the character input apparatus based on handwriting according to an embodiment of the present invention.
Figure 3:
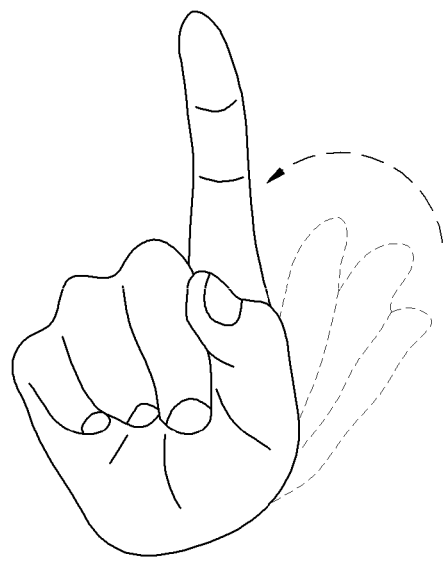
FIG. 3 is a view illustrating an example of an input start pattern in the character input apparatus based on handwriting according to an embodiment of the present invention.
Figure 4:
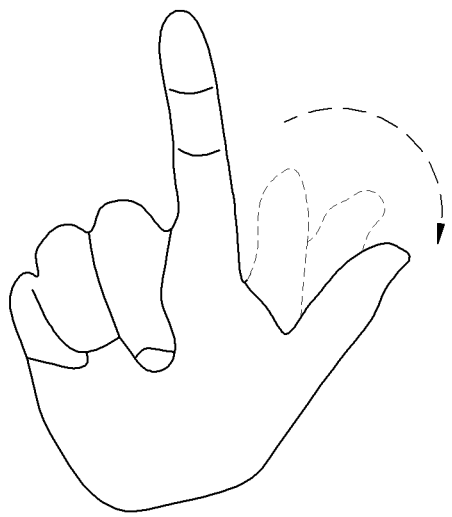
FIG. 4 is a view illustrating an example of an input end pattern in the character input apparatus based on handwriting according to an embodiment of the present invention.
Figure 5:
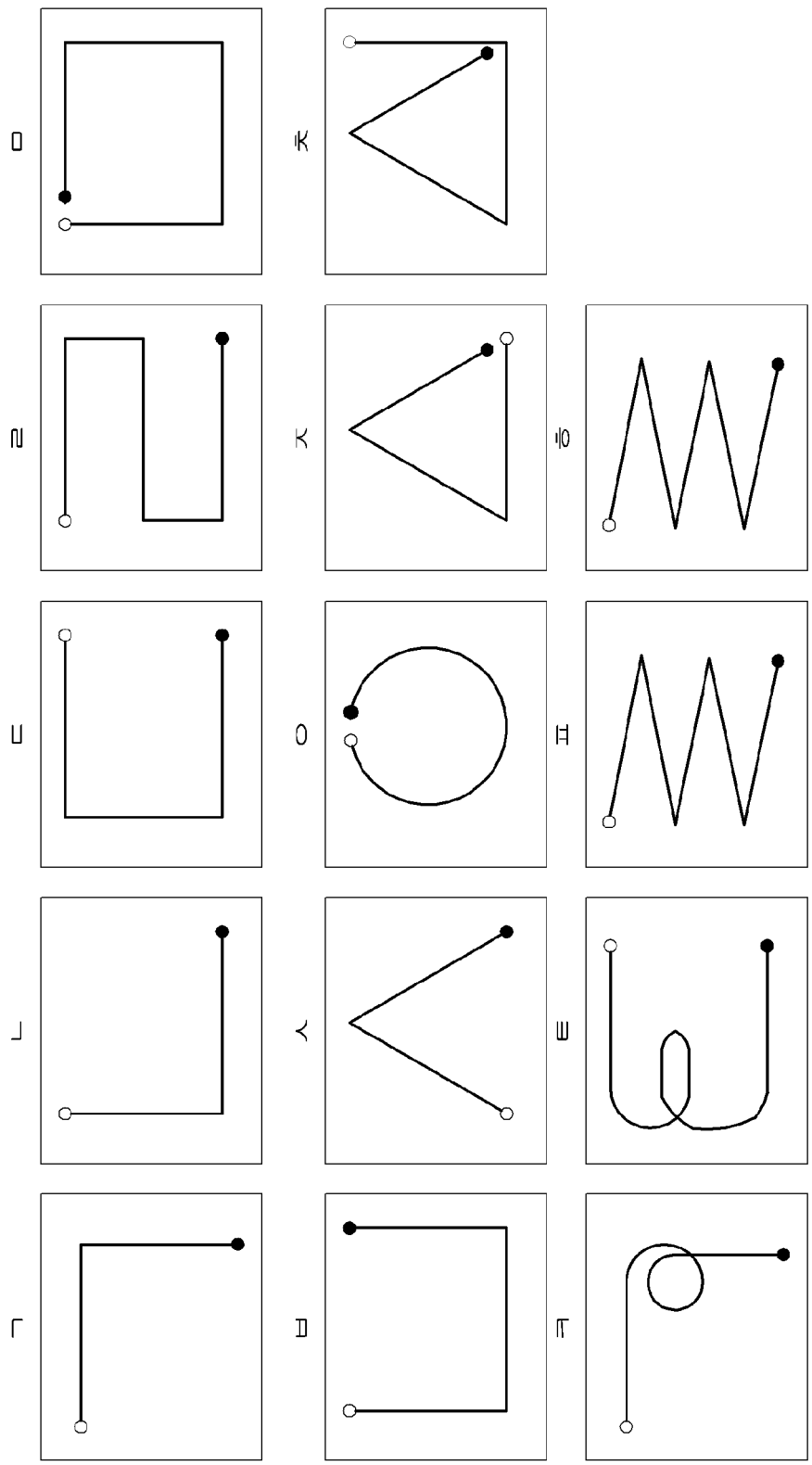
FIG. 5 is a view illustrating patterns of consonants in the character input apparatus based on handwriting according to an embodiment of the present invention.
Figure 6:
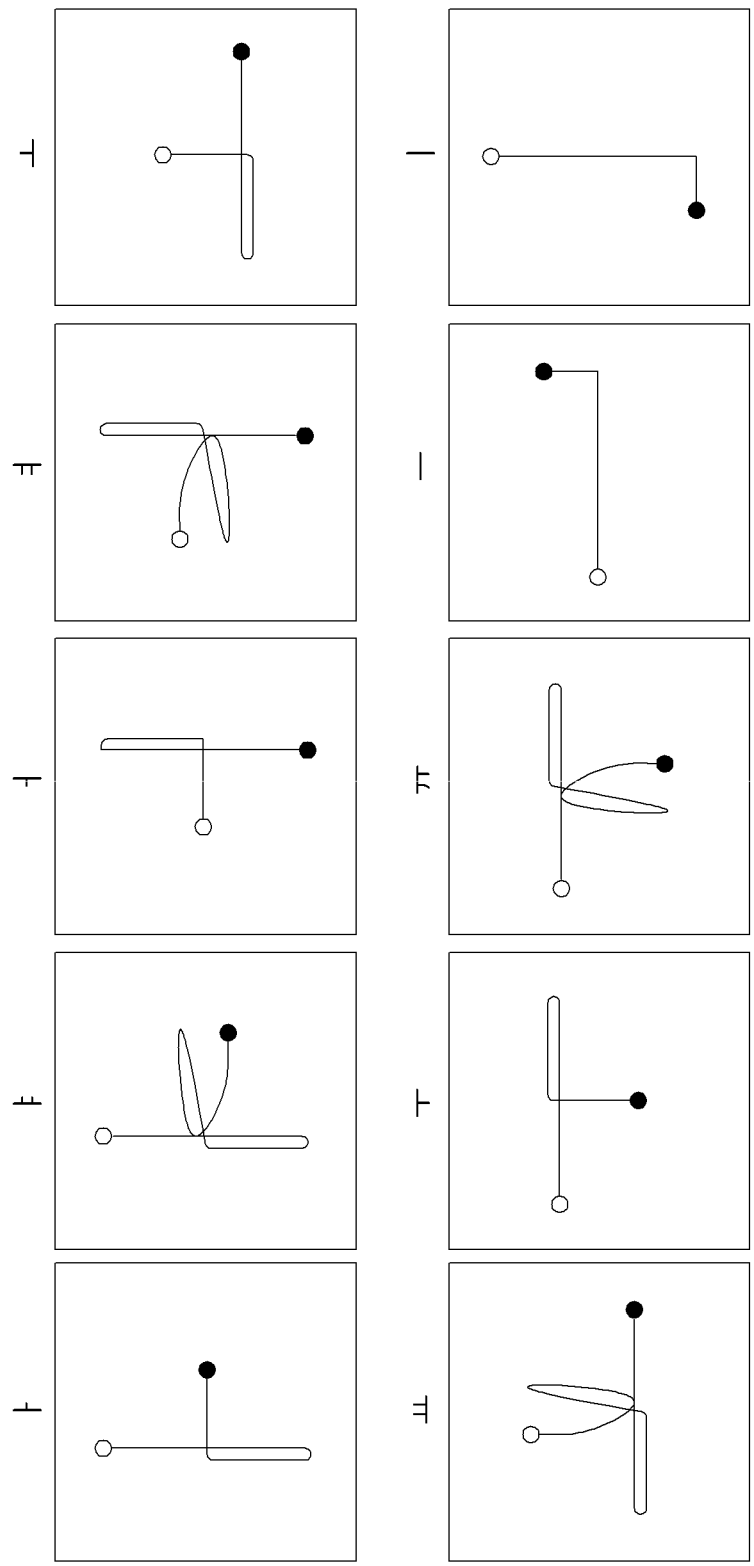
FIG. 6 is a view illustrating patterns of vowels in the character input apparatus based on handwriting according to an embodiment of the present invention.

FIG. 1 is a character input apparatus based on handwriting according to an embodiment of the present invention, FIG. 2 is a block diagram functionally illustrating the character input apparatus based on handwriting according to an embodiment of the present invention, FIG. 3 is a view illustrating an example of an input start pattern in the character input apparatus based on handwriting according to an embodiment of the present invention, FIG. 4 is a view illustrating an example of an input end pattern in the character input apparatus based on handwriting according to an embodiment of the present invention, FIG. 5 is a view illustrating patterns of consonants in the character input apparatus based on handwriting according to an embodiment of the present invention, and FIG. 6 is a view illustrating patterns of vowels in the character input apparatus based on handwriting according to an embodiment of the present invention.

Referring to FIGS. 1 through 6, a character input apparatus based on handwriting according to an embodiment of the present invention, which recognizes a pattern based on a motion of a hand moving in a space and inputs a character according to the recognized pattern, may include an image obtaining unit 110, a pattern storage unit 120, a pattern recognizing unit 130, and a display unit 140.

The image obtaining unit 110 may be a depth camera obtaining an image of a motion of a hand moving in a space and providing the obtained image to the pattern recognizing unit 130. Here, the image obtaining unit 110 may be a depth camera.

The depth camera generates distance information to an object and may be, typically, a camera using a time-of-flight (TOF) technique. The depth camera radiates an infrared or optical signal, measures a distance to the object using a phase difference between the optical signal and a signal returned after being reflected from an object, and outputs a depth image.

Thus, when the image obtaining unit 110 is a depth camera, the depth camera may obtain a three-dimensional (3D) image, and thus, the image obtaining unit 110 may recognize a motion in a forward/backward direction as well as motions of a hand in a horizontal direction and a diagonal direction. Here, a method for obtaining an image by a depth camera is known, and thus, detailed descriptions thereof will be omitted.

The pattern storage unit 120 stores various patterns required for inputting characters. In this case, the stored patterns are matched to various characters, respectively, and may be an input start pattern, an input end pattern, and a character pattern.

The input start pattern is a pattern indicating starting of character inputting, and the input end pattern may be a pattern indicating ending of character inputting. The input start pattern and the input end pattern may be variously set.

For example, as illustrated in FIG. 3, a motion of bending a thumb in a state in which an index finger and the thumb are spread out may be set as an input start pattern, and as illustrated in FIG. 4, a motion of spreading out the thumb in a state in which the index finger is spread out and the thumb is crooked may be set as an input end pattern.

The character pattern is a pattern matched to a character desired to be input. As illustrated in FIGS. 5 and 6, character patterns are matched to Hangul consonants and vowels. In FIG. 5, patterns matched to Hangul consonants "ㄱ, ㄴ, ㄷ, ㄹ, ㅁ, ㅂ, ㅅ, ㅇ, ㅈ, ㅊ, ㅋ, ㅌ, ㅍ, and ㅎ" are illustrated, and in FIG. 6, patterns matched to Hangul vowels "ㅏ, ㅑ, ㅓ, ㅕ, ㅗ, ㅛ, ㅜ, ㅠ, ㅡ, and ㅣ" are illustrated.

Hangul pair consonant "ㄲ, ㄸ, ㅃ, ㅆ, and ㅉ" were derived from Hangul consonants "ㄱ, ㄷ, ㅂ, ㅅ, and ㅈ", and thus, the Hangul pair consonants "ㄲ, ㄸ, ㅃ, ㅆ, and ㅉ" may be input by repeating patterns matched to Hangul consonants "ㄱ, ㄷ, ㅂ, ㅅ, and ㅈ" twice. Of course, separate patterns may be matched to the Hangul pair consonants "ㄲ, ㄸ, ㅃ, ㅆ, and ㅉ".

Also, Hangul vowels "ㅐ, ㅒ, ㅔ, ㅖ, ㅘ, ㅙ, ㅚ, ㅝ, ㅞ, ㅟ, and ㅢ" not illustrated in FIG. 6 may be input by combining Hangul vowels "ㅏ, ㅑ, ㅓ, ㅕ, ㅗ, ㅛ, ㅜ, ㅠ, ㅡ, and ㅣ" illustrated in FIG. 6, and although patterns matched to the Hangul vowels "ㅐ, ㅒ, ㅔ, ㅖ, ㅘ, ㅙ, ㅚ, ㅝ, ㅞ, ㅟ, and ㅢ" are not illustrated, obviously, separate patterns may be matched thereto. For example, Hangul vowel "ㅐ" may be input by combining Hangul vowels "ㅏ" and "ㅣ".

The pattern recognizing unit 130 may recognize a pattern according to a hand motion obtained by the image obtaining unit 110, compare the recognized pattern with the patterns stored in the pattern storage unit 120, and provide a character corresponding to the same pattern to the display unit 140.

Namely, when the recognized pattern is an input start pattern, the pattern recognizing unit 130 may compare and search for a character matched to a pattern recognized subsequently with patterns stored in the pattern storage unit 120, and output a searched character to the display unit 140.

When the recognized pattern is an input end pattern, even though an image related to a hand motion is input, the pattern recognizing unit 130 does not perform a character recognition operation.

In addition, when a recognized pattern corresponds to a consonant and the pattern is repeated twice within a predetermined period of time, the pattern recognizing unit 130 determines that the pattern corresponds to a pair consonant, and outputs a corresponding character.

In a case in which a recognized pattern is a vowel and another vowel continuously follows, the pattern recognizing unit 130 determines that the pattern corresponds to a derivative vowel, combines the two successive vowels, and outputs a combined vowel.

After an operation for inputting a character is executed, namely, after an input start pattern is input, if an image is not input within a predetermined period of time, the pattern recognizing unit 130 determines that character inputting has been terminated.

The display unit 140 displays a character output from the pattern recognizing unit 130, and may include a first display unit 141 and a second display unit 143.

The first display unit 141 is region for displaying a character matched to the current pattern recognized by the pattern recognition unit 130, and the second display unit 143 is a region in which a letter generated by combining characters transmitted from the pattern recognizing unit 130 is displayed.

Thus, the user may check a character input according to his or her hand motion through the first display unit 141 and may check a letter as a result of combining characters input by the user through the second display unit 143.

Figure 7:
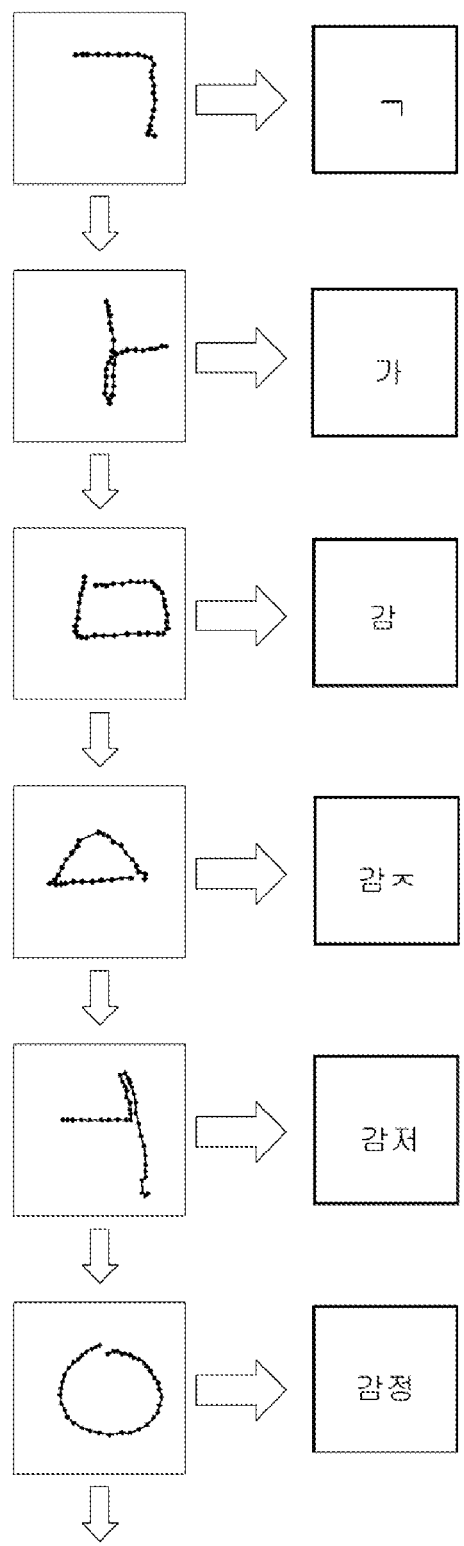
FIG. 7 is a view illustrating an example of inputting characters using the character input apparatus based on handwriting according to an embodiment of the present invention.

FIG. 7 is a view illustrating an example of inputting characters using the character input apparatus based on handwriting according to an embodiment of the present invention, in which it is assumed that a word of "감정" is input.

The word of "감정" is composed of units of phonemes of "ㅣ", "ㅏ", "ㅁ", "ㅈ", "ㅓ", and "ㅇ". Thus, when the user sequentially draws patterns of characters illustrated in FIGS. 5 and 6 with his or her hand to input the word "감정", the character input apparatus based on handwriting obtains and recognizes the patterns drawn by the user, and displays "감정" obtained by combining the characters in units of phonemes corresponding to the recognized patterns on the input character display unit 140.

Hereinafter, a character input method based on handwriting according to an embodiment of the present invention corresponding to the operations of the character input apparatus based on handwriting according to an embodiment of the present invention described above will be described in stages with reference to FIG. 8.

Figure 8:
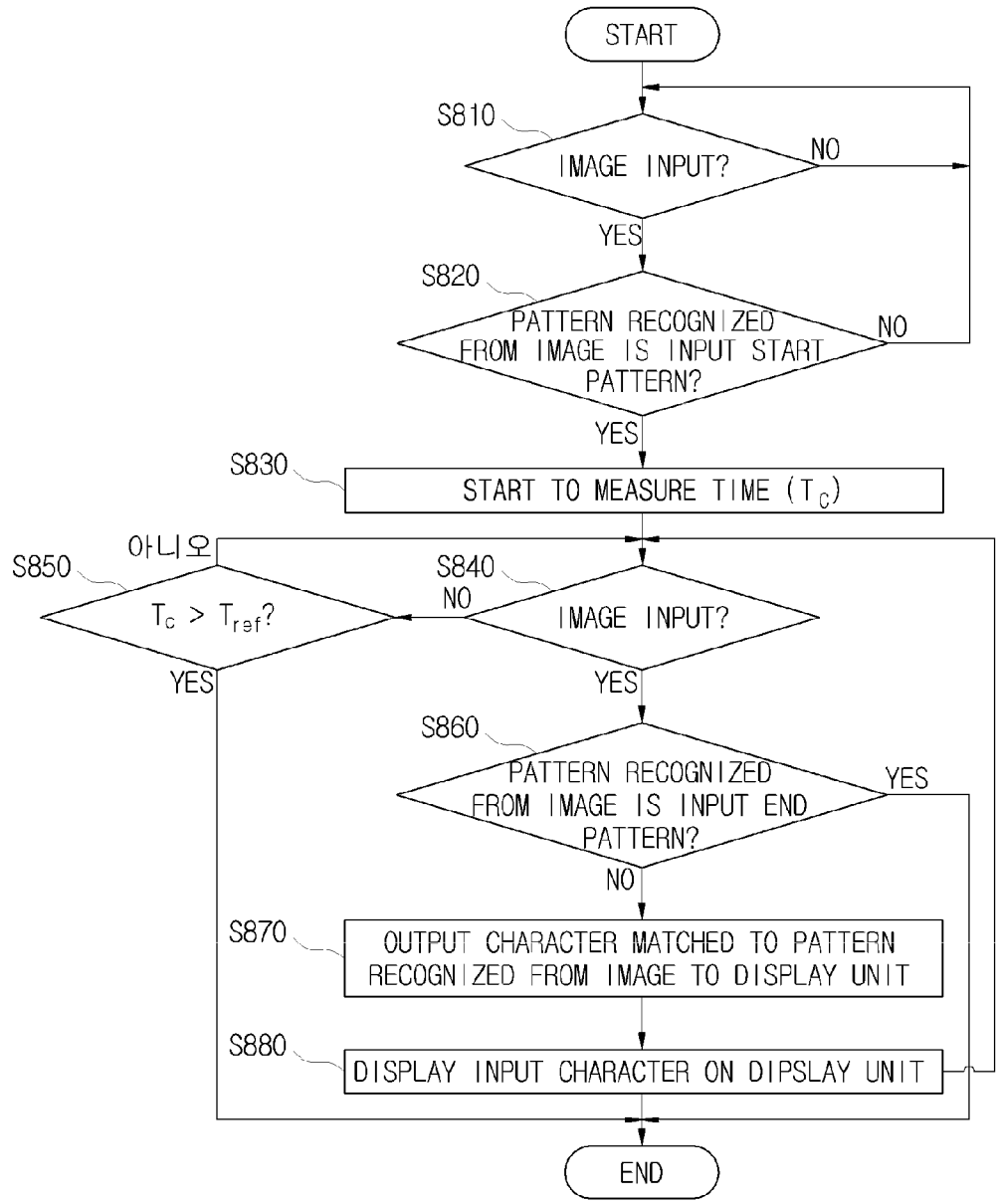
FIG. 8 is a flow chart illustrating an operation of a character input method based on handwriting according to an embodiment of the present invention.

FIG. 8 is a flow chart illustrating an operation of a character input method based on handwriting according to an embodiment of the present invention.

Referring to FIG. 8, when a character is input using the character input apparatus based on handwriting according to an embodiment of the present invention, it is determined whether an obtained image is input by the image obtaining unit 110 in step S810.

When an image is not input according to the determination result, whether an image is input is continuously determined, and when an image is input, a pattern is recognized from the input image, and it is determined whether the recognized pattern is an input start pattern in step S820.

When the pattern recognized in step S820 is not an input start pattern, step S810 is performed.

However, when the pattern recognized in step S820 is an input start pattern, a time starts to be measured from a point in time at which the input start pattern is determined in step S830, and it is determined whether an image is input, starting from the point in time at which the input start pattern is determined in step S840.

When it is determined that an image is not input in step S840, it is determined whether a time Tc measured from the point in time at which the input start pattern is determined has passed a preset reference time Tref in step S850.

When it is determined that the currently measured time Tc has not passed the reference time Tref, it is continuously determined whether an image is input in step S840, and when the currently measured time Tc has passed the reference time Tref, it is determined character inputting is terminated.

Meanwhile, when an image is input in step S840, a pattern is recognized from the input image, and whether the recognized pattern is an input end pattern in step S860.

When the recognized pattern is an input end pattern according to the determination result, it is determined that character inputting is terminated.

Meanwhile, it is determined that the recognized pattern is not an input end pattern in step S860, a character matched to the recognized pattern is output in step S870, the output character is provided to the display unit 140 to display the corresponding character in step S880, and the operation of step S840 is performed.

Here, displaying the character on the display unit 140 may be performed through a process of comparing the pattern recognized from the obtained image with previously stored patterns, and searching and extracting a character matched to the same pattern.

Also, in displaying the character matched to the pattern recognized from the obtained image, when the recognized pattern corresponds to a consonant and is repeated twice, it is determined that the recognized pattern corresponds to a pair consonant and a corresponding character is displayed, while when the recognized pattern is a vowel and another vowel continuously follows, it is determined that the recognized pattern corresponds to a derivative vowel and the two successive vowels are combined to be displayed.

Step S880 includes displaying a character matched to the currently recognized pattern on the first display unit 141 and displaying a letter according to the combination of the characters recognized so far on the second display unit 143.

In the character input apparatus and method based on handwriting according to embodiments of the present invention, characters can be input in a contactless manner according to a motion of a hand in a space.

Thus, since characters can be input from a remote area and since characters can be input in a contactless manner without using an input unit such as a remote controller, a keyboard, a mouse, and the like, user convenience can be enhanced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A character input apparatus comprising:
    at least one memory configured to store character input pattern information indicating at least one character input pattern required for inputting characters;
    at least one processor configured to generate an image capturing a motion of a hand moving in a space, recognize a character input pattern from the image, determine an input character based on the recognized character input pattern and the character input pattern information, and control a display of the character input apparatus to display the input character
    wherein, when a character input pattern corresponding to a consonant is recognized twice within a predetermined period of time, the at least one processor determines the input character to be a pair consonant.

2. The character input apparatus of claim 1, wherein when a first character input pattern corresponding to a first vowel and a second character input pattern corresponding to a second vowel are continuously recognized, the at least one processor determines the input character to be a derivative vowel which combines the first vowel and the second vowel.

3. The character input apparatus of claim 1, wherein the image is a 3D image generated using a depth camera.

4. A character input method performed by a character input apparatus, the method comprising:
    generating an image capturing a motion of a hand moving in a space;
    recognizing a character input pattern from the generated image:,
    determining an input character based on the recognized character input pattern and character input pattern information indicating at least one character input pattern required for inputting characters; and
    controlling a display of the character input apparatus to display the input character,
    wherein the determining comprises, when a character input pattern corresponding to a consonant is recognized twice within a predetermined period of time, determining the input character to be a pair consonant.

5. The character input method of claim 4, wherein the determining comprises, when a first character input pattern corresponding to a first vowel and a second character input pattern corresponding to a second vowel are continuously recognized, determining the input character to be a derivative vowel which combines the first vowel and the second vowel.

* * * * *